3,312,725
TOXIC ORGANOTIN BORATES
Gustav Weissenberger, Zurich, Switzerland, assignor to Monsanto Company, a corporation of Delaware
No Drawing. Filed May 20, 1963, Ser. No. 281,820
Claims priority, application Switzerland, May 25, 1962, 6,419/62
9 Claims. (Cl. 260—429.7)

The invention relates to organotin borates, biological toxicant compositions thereof and the use of these compounds for combatting pests, such as bacteria, amoebas, nematodes, larvae, insects, fungi etc. and undesired plants. The novel compounds are of the formula $$(R^1R^2R^3SnO)_aB(OH)_{3-a}$$

In this formula $R^1$, $R^2$ and $R^3$ are identical or different aliphatic, araliphatic, cycloaliphatic or aromatic radicals, especially hydrocarbon radicals, which are attached through a carbon atom and $a$ is a whole number of 1 to 3. Although the organic radicals may show an optional number of carbon atoms, such compounds are preferred having not more than 18 carbon atoms per R group, more preferably not more than 8 carbon atoms, in particular, alkyl groups having less than 6 carbon atoms, or phenyl groups such as the phenyl, a tolyl or a xylyl group.

For the preparation of these triorganotin borates which were not known until now, a simple process giving good yields was found which is based on the reaction of a bis-(triorganotin) oxide or a triorganotin hydroxide with boric acid. This reaction proceeds according to the general scheme $$aR_3SnOSnR_3 + 2B(OH)_3 \rightarrow 2(R_3SnO)_aB(OH)_{3-a} + aH_2O$$

or $$aR_3SnOH + B(OH)_3 \rightarrow (R_3SnO)_aB(OH)_{3-a} + aH_2O$$

Optional trialkyl, tricycloalkyl, triaralkyl, and triaryltin hydroxides, or the anhydric derivatives thereof, i.e. the stannoxanes, respectively, are suited for the process. All or part of the organic radicals may be unsaturated radicals, such as vinyl, allyl, cyclopentenyl, cyclohexenyl, cyclohexadienyl, styryl, cinnamyl etc.

The term "triorganotin" used throughout this description signifies therefore a tin atom containing three organic radicals, each of which are linked through a carbon atom with the tin atom and, possibly, are substituted.

Instead of boric acid, of course, compounds capable of forming boric acid can also be used. Such compounds are e.g. $B_2O_3$, $HBO_2$, $H_2B_4O_7$ etc. When both the reactants are anhydric, a small amount of water is necessary for the reaction.

In the practice of the process of preparation, a bis-(triorganotin) oxide or a triorganotin hydroxide is heated together with boric acid, or a boric acid-forming compound respectively, thereby the water which is formed in the reaction, if any, is continuously eliminated from the reaction mixture by evaporation, possibly under reduced pressure, or by azeotropic distillation with a solvent like benzene, toluene, xylene, cyclohexane etc. Water-binding agents, such as Linde molecular sieves, carbodiimides, iminechlorides, nitriles having negative α-substitu-ents, malonic dinitrile, tetracyanoethylene, cyanoacetic ester, carbonyldiimidazoles, carbonyl-ditriazoles etc. may also be used for this purpose.

Many triorganotin borates can be separated by distillation. They are liquid or solid products according to the kind of the organic substituents present and also the number of the triorganotin radicals being on the borine atom. They are soluble in the common organic solvents, such as hexane, halogenohydrocarbons, benzene, ether, dioxane, acetone, cyclohexanone, ethylalcohol, dimethylformamide, dimethylsulfone etc., but insoluble in water.

The compositions of this invention, containing as an essential component a mono, bis or tris-(triorganotin) borate or a mixture of such various borates, for combatting pests, for the treatment of cultivated plants or seeds, for the purpose of growth-promoting, and for the extermination of undesired plants, are applied in form of dispersions, emulsions, solutions, dusting or spraying materials. The active component can for this purpose be dissolved in solvents, such as hexane, kerosene, toluene, benzene, xylene, cyclohexane, methyethylketone, methanol, ethanol, isopropanol, butanediol, diacetone, isopropyl ether, ethylene dichloride, carbon tetrachloride, hydrogenated naphthalene, etc. Suitable solid extending agents include clay, bentonite, talc, pyrophylite, quartz, fuller's earth, kaolin, ground shale, kieselguhr, volcanic ash, chalk, salts etc.; chemically or physically modified minerals, such as acidwashed bentonite, precipitated calcium phosphate, precipitated calcium carbonate, elutriated chalk, calcined magnesia, colloidal silica, etc.; and other solid materials, such as powdered cork, powdered wood, powdered nut shells, active charcoal, etc.

Instead of or simultaneously with inert extending agents there can also be incorporated useful agents, for example, fertilizers, such as ammonium nitrate, urea, superphosphate, borax, etc. and/or humus, compost, etc.

Adhesives, emulsifying, suspending and/or wetting agents can be added, e.g. soaps, fatty alcohol sulfates, alkylarylsulfonates, ethylene oxide adducts of higher molecular compounds, like fatty acids, fatty alcohols and so on, long-chain quaternary salts, sulfite waste liquor, carboxymethyl cellulose, methyl cellulose, alginates, polyvinyl alcohol, spindle oil, etc. In such cases the active component can also be applied in the form of an emulsion or suspension in water.

In general, the extended means may contain about 5–80% of the active substance. If the composition permits, the means can be stirred with water to obtain an emulsion or a suspension prior to the application, thereby the active component may be present in amounts of, for example, about 0.01 to 0.1%.

The exact dosage of the novel means, for example in the application as a herbicide using phytotoxic amounts, is dependent not only upon the specific organotin compound but also upon the particular plant species to be controlled and the stage of growth thereof as well as the part of plant to be contacted with the phytotoxic compound.

Since the phytotoxicity and the fungotoxicity are not always concordant with respect to a certain triorganotin compound, the novel means in appropriate composition and dosage can also be used for the treatment of living cultivated plants or seeds to the end of combatting sickness caused by fungi and bacteria. In such cases often a promotion of growth can be detected which, for example, with tuber-plants like potatoes and beets is expressed by a higher yield. The novel active ingredients further are contact or stomach poisons against flies, scabs, silverfish, ants and other insects. They also display good activity towards mosquito larvae. Owing to their low toxicity to warm-bloods some of the compounds can be used for combatting ectoparasites on the skin of animals and for the treatment of pathological conditions which affect the alimentary tract of domestic animals and poultry. To the expert it is obvious that the compositions of this invention may have admixed other well-known bactericidal, insecticidal or fungicidal ingredients.

The advantageous activities of the means according to the invention will be illustrated by the following examples:

Example 1

16.48 g. (0.045 mole) of triphenyltin hydroxide and 0.915 g. (0.015 mole) of boric acid are refluxed in 90 ml. of benzene. The water formed in the reaction is continuously separated in a trap. The esterification is complete after ½ to 1 hour. Upon distillation of the benzene the residue is crystallized in ether. Yield 80%; M.P. 131–132° C.

Analysis.—$C_{54}H_{45}O_3BSn_3$. Calc.: C, 58.49%; H, 4.09%; B, 0.98%; Sn, 32.3%. Found: C, 58.36%; H, 4.11%; B, 0.92%; Sn, 32.1%.

Example 2

15.34 g. (0.03 mole) of bis-(n-tripropyltin)oxide and 1.24 g. (0.02 mole) of boric acid are refluxed in 80 ml. of benzene. The water formed in the reaction is continuously separated in a trap. The esterification is complete after ½ to 1 hour. Upon distillation of the benzene the remaining liquid is distilled in vacuum. Yield 75%; B.P. 138–140° C./0.001 mm.; $n_D^{20}$ 1.4880.

Analysis.—$C_{27}H_{63}O_3BSn_3$. Calc.: C, 40.4%; H, 7.8%; B, 1.35%; Sn, 44.4%. Found: C, 40.2%; H, 7.8%; B, 1.12%; Sn, 43.6%.

Example 3

17.86 g. (0.03 mole) of bis-(n-tributyltin)oxide and 1.24 g. (0.02 mole) of boric acid are refluxed in 80 ml. of benzene. The water formed in the reaction is continuously separated in a trap. The esterification is complete after ½ to 1 hour. Upon distillation of the benzene the remaining liquid is distilled in vacuum. Yield 75%; B.P. 195–200° C./0.001 mm.; $n_D^{20}$ 1.4848.

Analysis.—$C_{36}H_{81}O_3BSn_3$. Calc.: C, 46.6%; H, 8.7%; B, 1.16%; Sn, 38.4%. Found: C, 45.9%; H, 8.3%; B, 1.03%; Sn 37.5%.

Example 4

10.23 g. (0.02 mole) of bis-(n-tripropyltin)oxide and 1.24 g. (0.02 mole) of boric acid are refluxed in 50 ml. of benzene. The water formed in the reaction is continuously separated in a trap. The esterification is complete after ½ to 1 hour. Upon distillation of the benzene the remaining liquid is distilled in vacuum. Yield 90%; B.P. 175–180° C./0.2 mm.; $n_D^{20}$ 1.4884.

Analysis.—$C_{18}H_{43}O_3BSn_2$. Calc.: Sn, 42.8%. Found: Sn, 42.2%.

The presence of a hydroxyl group is shown by the infrared spectrum (peak at 3260 cm.$^{-1}$).

Example 5

For evaluation of the bacteriostatic and fungistatic effects a number of these new compounds are tested. The triorganotin borates are mixed in predetermined concentrations with hot sterile agar and poured into Petri dishes. The cooled masses are inoculated with *Staphylococcus aureus* and incubated for two days at 37° C. In another test series Sabouraud's dextrose agar containing the test compound is inoculated with *Aspergillus niger* and incubated for five days at 27° C. The products of Examples 1, 2 and 3 all inhibit the growth of the bacteria and of the micro-fungus at concentrations of the test chemical as low as 1:10$^6$. In a further experiment the agar is inoculated with *Salmonella typhosa* and incubated for 2 days at 37° C. The compound of Example 2 inhibits totally the growth of this bacterium at a concentration even as low as 1:10$^6$, while in comparison, triphenyltin hydroxide boric acid, tris(triphenyltin)phosphate and tris(tributyltin)phosphate are not able to inhibit the growth of this bacterium even at a concentration of 1:10$^3$. Thus, tris(n-propyltin)borate is effective at high dilution against gram-positive as well as gram-negative microbes.

Usually these novel triorganotin borates will be applied at concentrations in the range of 0.0001% to 1.0%, preferably 0.001% to 0.1%. For this purpose they can be applied in form of solutions, emulsions or suspension together with adhesives, wetting and/or extending agents.

Example 6

In this example the pre-emergent herbicidal ratings of some of the triorganotin borates of this invention is determined.

A specific number of seeds of 12 different plants, each representing a principal botanical type, are planted in greenhouse flats. For this purpose aluminum pans of about 23×33×5 cm. are filled with a good grade of top soil and compacted to a depth of 1 cm. from the top of the pan. On top of the soil are placed five seeds of each of radish, morning glory, and tomato; 10 seeds of each of sugar beet, sorghum, and brome grass; 20 seeds of each of wild buckwheat, giant foxtail, rye grass, wild oat; approximately 20 to 30 (a volume measure) of each pigweed and crab grass; and either 2 or 3 seeds of soybean. These seeds are scattered over the soil surface, covered with 1 cm. of soil mixture and the content leveled. The seeds of the monocotyledons or grasses and of the dicotyledons or broadleafs are separately planted, however, in the same pan. The herbicidal composition is applied to the plantings prior to the watering of the seeds. The application is made by spraying the surface of the soil with an acetone solution containing a sufficient quantity of the candidate triorganotin compound to obtain the desired rate per acre. In the series denoted by * the compounds to be tested are thoroughly incorporated into the soil which is used for covering the seeds, instead of being sprayed on the surface. The watering of the seeds is accomplished by placing the pans in a sand bench. Water is added to a depth of 1.3 cm. and the soil is permitted to absorb moisture through the perforated bottom of the pans as the excess water drains from the bench. The pans are maintained there for 14 days under ordinary conditions of sunlight and watering.

At the end of this time, the plants are observed and the results recorded by counting the number of plants of each species which germinated and grew. The herbicidal rating is expressed by means of a fixed scale based on the average percent germination of each seed lot.

The phytotoxic activity of some of the triorganotin borates of invention in pre-emergent tests can be noted from the Table 1. The seeds which are used, are represented by letters as follows:

A  Morning glory
B  Wild oats
C  Brome grass
D  Rye grass
E  Radish
F  Sugar beet
G  Foxtail
H  Crab grass
I  Pigweed
J  Soybean
K  Wild buckwheat
L  Tomato
M  Sorghum

TABLE 1

| Compound of— | Dosage lbs./acre | Rate of Injury to Plants | | | | | | | | | | | | |
|---|---|---|---|---|---|---|---|---|---|---|---|---|---|
| | | A | B | C | D | E | F | G | H | I | J | K | L | M |
| Example 1 | 25 | 0 | 0 | 0 | 0 | 0 | 1 | 2 | 2 | 2 | 3 | 0 | 1 | 0 |
|  | *5 | 0 | 0 | 0 | 2 | 0 | 1 | 3 | 3 | 3 | 0 | 3 | 0 | 0 |
| $[(C_6H_5)_3SnO]_3PO$ | 25 | 0 | 3 | 1 | 1 | 0 | 0 | 3 | 3 | 3 | 0 | 3 | 3 | 0 |
| Example 2 | 25 | 3 | 3 | 3 | 3 | 3 | 3 | 3 | 3 | 3 | 3 | 3 | 3 | 0 |
|  | *5 | 3 | 2 | 3 | 3 | 3 | 3 | 3 | 3 | 3 | 3 | 3 | 3 | 3 |
|  | *1 | 0 | 0 | 3 | 3 | 3 | 3 | 3 | 3 | 3 | 3 | 3 | 3 | 3 |
| Example 3 | 25 | 1 | 3 | 3 | 3 | 3 | 3 | 3 | 3 | 3 | 1 | 3 | 2 | 1 |
|  | *5 | 1 | 1 | 3 | 3 | 3 | 3 | 3 | 3 | 3 | 3 | 3 | 3 | 3 |
| $[(C_4H_9)_3SnO]_3PO$ | 5 | 0 | 0 | 0 | 0 | 2 | 3 | 3 | 3 | 3 | 0 | 3 | 3 | 2 |
| Boron triacetate | 25 | 0 | 0 | 1 | 0 | 0 | 1 | 0 | 0 | 0 | 0 | 0 | 0 | 0 |
| Boric acid | 25 | 2 | 0 | 0 | 1 | 0 | 0 | 2 | 3 | 3 | 2 | 1 | 1 | 2 |

Legend.—Inhibition of growth: 0=0–25%; 1=26–50%; 2=51–75%; 3=76–100%.
*See explanation in the specification.

The data in Table 1 illustrates the general herbicidal activity as well as the selective herbicidal activity of the compounds which have been examined. Thus, these compounds are particularly useful in soil sterilization applications. For many compounds soil incorporation at 5 pounds per acre gives essentially the same activity as if applied at a concentration of 25 pounds per acre on the surface.

*Example 7*

In this example the contact herbicidal activity of some of the triorganotin borates of invention is determined in greenhouse tests using 2 or 3 weeks old plants. The compounds to be tested are applied in spray form to 14 or 21 days old specimens of the same grasses and broadleaf plants as used in Example 6. The same number of seeds are planted and arranged in the same manner in aluminum pans of about 24×15×7 cm., as in Example 6. After the seedlings are 14 or 21 days old, the foliage in each pan is sprayed with 6 ml. or less of a 0.5% concentration solution of the candidate triorganotin borate. This concentration corresponds to about 10 lbs. per acre. This herbicidal solution is prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent is a mixture comprising 35 wt. percent of butylamine dodecylbenzenesulfonate and 65 wt. percent of a tall oil-ethylene oxide condensate having about 6 moles of ethylene oxide per mole of tall oil.

The injuries to the plants are then observed 14 or 21 days later.

*Example 8*

In this example the contact activity against yellow fever mosquito larvae is determined.

A weighed sample of the triorganotin borate is dissolved in acetone to give the desired concentration in mg. per liter. A culture tube is filled with 0.05 ml. of this solution and 50 ml. of distilled water, and shaken vigorously. Then, approximately 20 larvae are suspended therein and held at room temperature for 24 hours. The mortality of the larvae is subsequently determined. The kill is with, for example, tris-(triphenyltin)borate using a concentration of 0.2 p.p.m.=100%.

The kill with boric acid at 0.001% is zero.

*Example 9*

In this example the contact insecticidal activity is determined. Adults of plum curculio (*Conotrachelus nenuphar*, Hbst.) are anesthetized with carbon dioxide. Then, on the under side of abdomen is placed 1 microliter of a solution containing 10 microgram tris-(tributyltin) borate. A topical applicator fitted with a 0.25 cc. syringe which is able to deliver one microliter of solution is used. After the treatment three plum curculio each are set together with a small slice of apple into plastic tubes (5×1.9 cm.), stoppered at each end with a sifter cap and held at room temperature for 48 hours.

After this time a 100% kill is observed, while the control-insects are still living. In comparison, boric acid and tris-(triphenyltin)phosphate do not kill the insects at twice this concentration.

*Example 10*

In this example is shown that the triorganotin borates are active also as a stomach poison insecticide.

The same applicator and the same solution is used as in Example 9. Lima bean leaf discs of 7 mm. in diameter are punched and placed on moist blotter paper with-

TABLE 2

| Compound of— | Concentration, wt. percent | Rate of Injury to Plants | | | | | | | | | | | | |
|---|---|---|---|---|---|---|---|---|---|---|---|---|---|
| | | A | B | C | D | E | F | G | H | I | J | K | L | M |
| Example 1 | 0.5 | 2 | 0 | 0 | 0 | 4 | 4 | 3 | 1 | 4 | 0 | 4 | 4 | 0 |
|  | 0.05 | 2 | 0 | 0 | 0 | 4 | 3 | 0 | 0 | 4 | 1 | 2 | 4 | 0 |
| Example 2 | 0.5 | 4 | 4 | 4 | 4 | 4 | 4 | 4 | 4 | 4 | 3 | 4 | 4 | 4 |
|  | 0.05 | 2 | 2 | 2 | 2 | 4 | 4 | 4 | 2 | 4 | 2 | 4 | 4 | 4 |
|  | ¹0.01 | 0 | 0 | 0 | 0 | 4 | 2 | 1 | 1 | 4 | 2 | 4 | 4 | 4 |
| Example 3 | 0.5 | 3 | 4 | 4 | 3 | 4 | 4 | 4 | 3 | 4 | 2 | 4 | 4 | 0 |
|  | 0.05 | 1 | 2 | 4 | 4 | 4 | 2 | 4 | 2 | 4 | 2 | 4 | 4 | 3 |
| For Comparison: $B(OH)_3$ | ²0.5 | 0 | 0 | 0 | 0 | 0 | 0 | 0 | 0 | 0 | 0 | 0 | 0 | 0 |

Legend.—Inhibition of growth: 0=0–24%; 1=25–49%; 2=50–74%; 3=75–99%; 4=Complete kill.
¹ There are used 3 weeks old plants instead of 2 weeks old plants.
² Chlorosis general.

From the Table 2 can be seen, moreover, that the contact activity of the compound of Example 1, namely tris-(triphenyltin) borate, is considerably greater against dicotyledons than against monocotyledons.

The compounds of the invention are very phytotoxic to the foliage of woody plants such as trees, bushes, etc.

in a plastic box. Two microliter of a solution containing 10 micrograms per microliter of the candidate compound in acetone is applied to each disc by means of the topical applicator. After the solvent is evaporated, a second instar Southern army worm larva (*Prodenia eridania*, Cram) is encaged with each leaf disc by using a black plastic cap of 2 cm. in diameter. (The leaf disc is small enough to permit complete consumption by the larva.)

After a 48 hours holding period at room temperature, a 100% kill is observed with tris-(tributyltin)borate or tris-(triphenyltin)borate, while the control larvae and those treated with an equal amount of, for example, tris (triphenyltin)phosphate or boric acid are still living.

*Example 11*

In this example the fungicidal activity is determined. Corn meal cultures of the soil borne fungi *Phytium ultimum* and *Rhizoctonia solani* are incorprated into sterile soil and each separately packed in 30 ml. cups. The surface of the soil is drenched with tris-(tripropyltin) borate. The concentration used corresponds to 30 mg. per kilogram of soil. The cups are held in 100% relative humidity chamber at 18–20° C. for 50–60 hours.

A complete inhibition of the mycelium growth is observed on the surface of the soil.

In another experiment is found that the germination of Venturia Inaequalis is completely inhibited in water suspension by tris-(tripropyltin)borate and tri-(triphenyltin)borate using a concentration of 0.00003%; whereas, a remarkable germination is obtained at a concentration of 0.0001% with tris-(triphenyltin)phosphate.

What is claimed is:

1. A compound of the formula $(R^1R^2R^3SnO)_3B$ wherein $R^1$, $R^2$ and $R^3$ are selected from the class consisting of aliphatic, araliphatic, cycloaliphatic and aromatic radicals attached through a carbon atom to the tin.
2. A compound of claim 1 wherein $R^1$, $R^2$ and $R^3$ are hydrocarbon radicals having not more than 18 carbon atoms.
3. A compound of claim 1 wherein $R^1$, $R^2$ and $R^3$ are hydrocarbon radicals having not more than 8 carbon atoms.
4. Tris(triphenyltin)borate.
5. Tris(n-tripropyltin)borate.
6. Tris(n-tributyltin)borate.
7. A process for the preparation of a compound of the formula $(R^1R^2R^3SnO)_aB(OH)_{3-a}$ wherein $R^1$, $R^2$ and $R^3$ are selected from the class consisting of aliphatic, araliphatic, cycloaliphatic and aromatic radicals attached through a carbon atom to the tin, and $a$ is an integer of from 1 to 3, comprising reacting at a temperature at which water is formed a compound selected from the class consisting of $(R^1R^2R^3Sn)_2O$ and $R^1R^2R^3SnOH$ with boric acid and continuously separating water formed from the reaction mixture.
8. A process of claim 7 wherein the water is removed from the reaction mixture by azeotropic distillation.
9. A herbicidal concentrate composition comprising an inert carrier and a herbicidal amount of a compound of the formula $(R^1R^2R^3SnO)_3B$ and wherein $R^1$, $R^2$ and $R^3$ are selected from the class consisting of aliphatic, araliphatic, cycloaliphatic and aromatic radicals attached through a carbon atom to the tin.

References Cited by the Examiner

UNITED STATES PATENTS

| | | | |
|---|---|---|---|
| 2,978,310 | 4/1961 | Daams et al. | 71—2.3 |
| 3,027,248 | 3/1962 | Koopman et al. | 71—2.3 |
| 3,098,862 | 7/1963 | Kobetz | 260—429.7 |
| 3,100,215 | 8/1963 | Gelbert | 260—429.7 |
| 3,116,307 | 12/1963 | Leavitt et al. | 260—429.7 |
| 3,140,977 | 7/1964 | Duyfjes et al. | 260—429.7 X |

HELEN M. McCARTHY, *Acting Primary Examiner.*

JULIAN S. LEVITT, TOBIAS E. LEVOW, *Examiners.*

J. O. THOMAS, W. F. W. BELLAMY,
*Assistant Examiners.*